(No Model.)

M. L. WINDIATE.
EGG TESTING PACKET.

No. 389,625.          Patented Sept. 18, 1888.

WITNESSES
Edwin T. Yewell,
M. H. Pumphrey.

INVENTOR
Mary L. Windiate
per L. Bonpland & Co.
Attorneys

UNITED STATES PATENT OFFICE.

MARY L. WINDIATE, OF CHICAGO, ILLINOIS.

EGG-TESTING PACKET.

SPECIFICATION forming part of Letters Patent No. 389,625, dated September 18, 1888.

Application filed July 29, 1886. Serial No. 209,492. (No model.)

*To all whom it may concern:*

Be it known that I, MARY L. WINDIATE, of Chicago, county of Cook, and State of Illinois, have invented certain new and useful Improvements in Egg - Testing Packets, of which the following is a full, clear, and exact description, that will enable others to make and use the same, reference being had to the accompanying drawings, forming a part of this specification.

The object of this invention is to provide an egg-packet whereby the contents of each rack making up the series in the shipping-case may be tested without removing the eggs from said racks.

This invention relates to a division-board or diaphragm to be inserted between the racks when built up in layers in the packing or shipping case; and the same consists of a perforated diaphragm, the perforations corresponding in number to the egg - cells in the rack in order to expose the contents from below; and it also consists in providing the diaphragm with flaps which are adapted to be turned upward at right angles to inclose the racks in a box-like receptacle, all as will be hereinafter set forth in detail, and pointed out in the claim.

Figure 1:
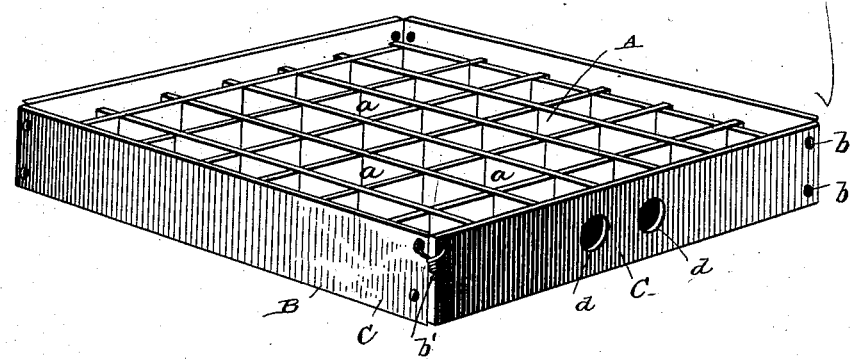
Figure 2:
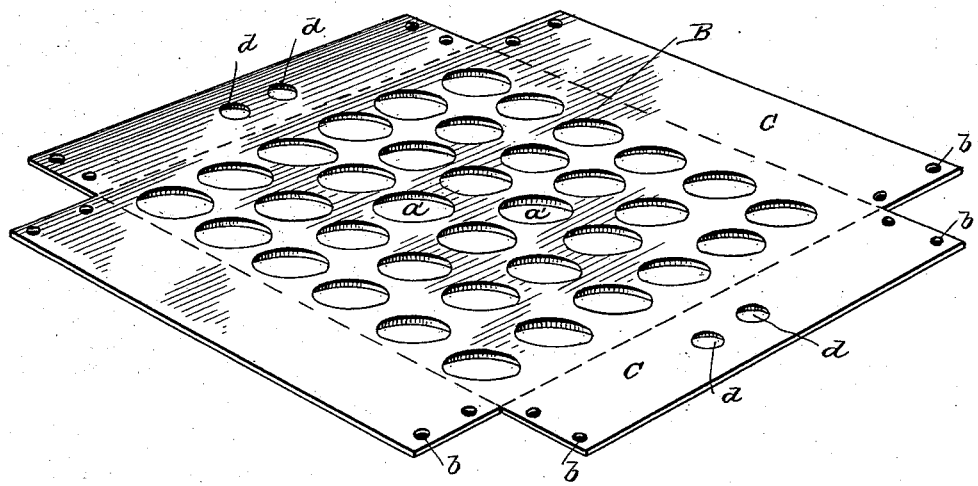

Figure 1 is a view in perspective of the ordinary cell-rack inclosed by my improved feature, and Fig. 2 a plan and perspective of my improved division-board or diaphragm.

In the drawings, A represents the ordinary egg-holding rack, provided with the egg cells or compartments $a$.

B is a division-board or diaphragm, provided with the egg - perforations $a'$. These perforations correspond in number to the cells in the rack A, and are of such a diameter as to expose a part of the surface of each egg from the under side, so that when the rack and contents are held over a light the exact condition of each egg is readily observed from above.

The diaphragm is provided with the flaps C, formed integral therewith, and the material may be scored or creased along the junction of the diaphragm and flaps, as indicated by broken lines in Fig. 2, so that the latter may be readily turned upward at right angles and inclose the egg-rack in a box-like receptacle, as shown in Fig. 1. The ends of the flaps, forming the corners when turned at right angles, are provided with the perforations $b$, for the insertion of the fastening device $b'$, which secures or locks the corners together. These corners may be secured by a piece of wire, as shown, or some other suitable means.

Two or more of the flaps C are provided with the finger-holes $d$, by which means each rack and contents and the inclosing or box diaphragm may be conveniently lifted out of the packing or shipping case in a body, the division-board forming a bottom. By this arrangement each rack, as it is lifted out of the case, may be held over a light and the contents tested or candled without having to remove any of the eggs from the rack in the same length of time that is required to candle one-half dozen by the ordinary mode now practiced, which consists of grasping three eggs in each hand and passing them over a light; and in addition to this the eggs must all be removed from and replaced in each rack, which not only requires a great deal of time and handling, but also increases the loss from breakage.

Ordinarily each of the series of racks contains three dozen eggs, and by means of this perforated box-diaphragm the racks may be quickly and conveniently removed from the shipping-case and candled and repacked. The box-diaphragm not only serves as a division-board to be inserted between the racks in the packing-case, but also forms an inclosing-wall for the protection and strengthening of the racks, thereby rendering the same more durable, and at the same time affords means for removing the rack and its contents in a body. It is obvious, of course, that two flaps instead of four might be made to serve the purpose; but the structure shown is preferable.

Having thus described my invention, what I claim as new, and desire to secure by Letters Patent, is—

The combination of an egg-holding rack, a perforated division-board provided with flaps adapted to turn upward and having their edges abutting to form corners, and two or more of said flaps having finger-holes $d$, and a fastening device for each of said corners.

MARY L. WINDIATE.

Witnesses:
L. M. FREEMAN,
L. B. COUPLAND.